United States Patent [19]

Brown et al.

[11] Patent Number: 5,500,480
[45] Date of Patent: Mar. 19, 1996

[54] PROCESS FOR THE PRODUCTION OF AN ALUMINUM HYDROXIDE AL(OH)$_3$ HAVING ROUNDED GRAIN SURFACES

[75] Inventors: Neil Brown, Bergheim/Erft; Detlef V. Peij, Bedburg, both of Germany

[73] Assignee: Martinswerk G.m.b.H. für chemische und metallurgische Produktion, Bergheim, Germany

[21] Appl. No.: 494,784

[22] Filed: Jun. 26, 1995

Related U.S. Application Data

[63] Continuation of Ser. No. 370,813, Jan. 10, 1995, which is a continuation of Ser. No. 120,785, Sep. 15, 1993, abandoned.

[30] Foreign Application Priority Data

Sep. 23, 1992 [DE] Germany .......................... 42 31 874.2

[51] Int. Cl.$^6$ ............................... C08K 3/10; C01F 7/34; C01F 7/02
[52] U.S. Cl. .................... 524/437; 23/305 A; 106/400; 423/628; 423/629
[58] Field of Search ................................... 423/625, 626, 423/628, 629; 106/400; 23/305 A; 524/437

[56] References Cited

U.S. PATENT DOCUMENTS

| | | | |
|---|---|---|---|
| 4,234,559 | 11/1980 | Tschamper | 23/305 A |
| 4,340,579 | 7/1982 | Greber et al. | 423/625 |
| 4,530,699 | 7/1985 | Schlesinger et al. | 23/305 A |
| 4,574,074 | 3/1986 | Cristol et al. | 23/305 A |
| 5,130,113 | 7/1992 | Kitayama et al. | 524/437 |
| 5,158,577 | 10/1992 | Hiscox et al. | 23/305 A |

FOREIGN PATENT DOCUMENTS

| | | |
|---|---|---|
| 011667 | 11/1980 | European Pat. Off. . |
| 407595 | 1/1991 | European Pat. Off. . |
| 246528 | 6/1987 | German Dem. Rep. . |
| 2743682 | 3/1978 | Germany . |

*Primary Examiner*—Gary P. Straub
*Attorney, Agent, or Firm*—Fisher, Christen & Sabol

[57] ABSTRACT

A process for the production of an aluminum hydroxide with rounded grain surfaces. An alkaline solution of a specific composition derived from the Bayer process is inoculated and adsorptively precipitated with an aluminum hydroxide with a specific grain distribution. The aluminum hydroxide obtained according to the new process is especially suitable for the flameproof finishing of polyesters.

2 Claims, No Drawings

＃ PROCESS FOR THE PRODUCTION OF AN ALUMINUM HYDROXIDE AL(OH)₃ HAVING ROUNDED GRAIN SURFACES

This is a continuation application of Ser. No. 08/370,813, filed on Jan. 10, 1995, which is a continuation application of Ser. No. 08/120,785, filed on Sep. 15, 1993 now abandoned.

BACKGROUND OF THE INVENTION

1. Field of the Invention

The invention relates to a new process for the production of an aluminum hydroxide [$Al(OH)_3$] having rounded grain surfaces as well as flameproof plastic materials containing $Al(OH)_3$ as filler.

2. Background Art

Aluminum hydroxide is a filler long known for flameproofing polymeric materials. The $Al(OH)_3$ obtained from the Bayer process is mainly used as a filler either directly or optionally after a grinding process. However, the grain surfaces of these hydroxides are very irregular, sharp-edged and fissured and, as a result, produce a rough surface in the correspondingly filled plastic molded articles, In the incorporation of ground Bayer $Al(OH)_3$ into plastic, unforeseeable viscosity variations were also observed that raise substantial problems in the manufacturing process. To counteract these difficulties, efforts have been made to coat the surface of the $Al(OH)_3$ particles with silanes (German Patent No. 2,743,682). Besides the additional effort and the additional costs that result from the separate coatings, the processing properties of the so-treated $Al(OH)_3$ are still unsatisfactory.

According to European Published Patent Application No. 011,667, it was then attempted to convert the $Al(OH)_3$ resulting from the Bayer process which is present as agglomerates of individual crystals into a heated aluminum subsaturated Bayer alkaline solution and to stir it for 1 to 25 hours, whereupon the solid is separated. The original agglomerates are separated by this treatment at their grain boundaries. Thus, the individual primary crystals undergo a rounding; moreover, the resulting rounded $Al(OH)_3$ particles have practically no fine-grain portion. This $Al(OH)_3$ shows a very good viscosity behavior in plastic, and moreover the resulting surfaces the filled plastic molded articles are smooth. However, a substantial drawback in this process is that contaminants enclosed in the original Bayer $Al(OH)_3$ are precipitated onto the resulting $Al(OH)_3$ which leads to discoloration when using unsaturated polyester resins (UP resins).

It was proposed according to European Published Patent Application No. 407,595 that $Al(OH)_3$ aggregates derived from the Bayer process be physically deagglomerated, e.g., by centrifugation or by grinding in a ball mill. But damages to the grain surfaces occur through the physical treatment which has a detrimental effect on the processing properties in the plastic. Moreover, such a treatment involves considerable expense.

BROAD DESCRIPTION OF THE INVENTION

The main objective of the invention is to provide a process that eliminates the above-mentioned drawbacks of the known processes, and that produces $Al(OH)_3$ which has rounded grain surfaces and that has excellent processing properties in plastics. Other objectives and advantages of the invention are set out herein or are obvious herefrom to one skilled in the art.

The objectives and advantages of the invention are achieved by the processes, materials and compositions of the invention.

The invention involves a process for the production of aluminum hydroxide $Al(OH)_3$ having rounded gain surfaces. In the process, an alkaline solution derived from the Bayer process, having a molar ratio of $Na_2O$ to $Al_2O_3$ of 2.0 to 2.3, is inoculated with an aluminum hydroxide, having a gain diameter in the 50 percent range $d_{50}$ of 5 to 25 μm, in the 90 percent range $d_{90}$ of 10 to 50 μm, in the 10 percent range $d_{10}$ of 1.0 to 4.5 μm, and then is precipitated with the resulting solid subsequently being filtered off.

Preferably the aluminum hydroxide used for the seeding is obtained by grinding and then grading an aluminum hydroxide derived from the Bayer process, having a grain diameter in the 50 percent range $d_{50}$ of 30 to 100 μm, and consisting of primary crystals having a grain diameter in the 50 percent range $d_{50}$ of 5 to 25 μm. Preferably the seed material is added to the alkaline solution at a temperature between 60° and 75° C. Preferably the seed material is added to the alkaline solution in an amount of 25 to 500 g/l. Preferably, after seeding, the precipitation takes place until a molar ratio of $Na_2O$ to $Al_2O_3$ of 2.6 to 3.1 has been reached.

The invention also involves aluminum hydroxide having rounded grain surface with a grain diameter in the 50 percent range $d_{50}$ of 5 to 25 μm, in the 90 percent range $d_{90}$ of 10 to 50 μm, and in the 10 percent range $d_{10}$ of 1.0 to 4.5 μm, a BET surface of 0.3 to 1.3 $m^2/g$ and a surface roughness coefficient of 1.1 to 1.5, produced according to the invention process.

The invention involves plastic materials, molding compounds or molded parts composed of polymeric materials which contain the aluminum hydroxide, having rounded grain surfaces, of the invention.

The invention further includes compositions of polymers containing the invention aluminum hydroxide as a flame-retarding filler and a process of preparing such compositions.

DETAILED DESCRIPTION OF THE INVENTION

To obtain the $Al(OH)_3$ used in the process according to the invention, an $Al(OH)_3$ derived from the Bayer process is ground in a way which is conventional to one skilled in the art, e.g., in a ball mill, and graded with a suitable screening device.

This Bayer $Al(OH)_3$ is originally available as an agglomerate with a particle size in the 50 percent range $d_{50}$ of 30 to 100 μm, usually of 50 to 70 μm. Correspondingly the primary crystals have a particle size in the 50 percent range $d_{50}$ of 2 to 25 μm, suitably of 5 to 25 μm. The specific surface according to BET is suitably between 0.1 and 0.5 $m^2/g$, which results in a surface roughness of 2 to 6 (expressed as the quotient of the measured specific surface according to BET and the calculated surface based upon the assumption of the ideal ball shape of the particles).

The grinding and grading of the Bayer $Al(OH)_3$ is carried out so that $Al(OH)_3$ particles result which have the following specifications:

grain diameter in the 50 percent range $d_{50}$ of 5 to 25 μm, grain diameter in the 10 percent range $d_{10}$ of 1.0 to 4.5 μm, gain diameter in the 90 percent range $d_{90}$ of 10 to 50 μm, specific surface, according to BET, of 1 to 3 m²/g, surface roughness of 2 to 6.

With this ground and graded Al(OH)$_3$, an alkaline solution which is obtained according to the invention from the Bayer process and which has a molar ratio of Na$_2$O to Al$_2$O$_3$ of 2.0 to 2.3, is inoculated. The alkaline solution having a suitable composition can be obtained, for example, by mixing in equal parts a clear alkaline solution (K-solution) having a temperature of about 95° C., which is derived from the Bayer process and which has a Na$_2$O content of about 140 g/l and an Al$_2$O$_3$ content of 150 g/l, with a so-called P alkaline solution having a temperature of, e.g., 45° C., which was obtained after the crystallization of the Al(OH)$_3$, and which has a Na$_2$O content of about 150 g/l and an Al$_2$O$_3$ content of about 85 g/l. Depending on the respective mixture ratio, the obtained alkaline solution has a temperature of 45° to 95° C.

Preferably the seed material is added when the alkaline solution has at a temperature of 60° to 75° C.

The amount of seed material depends on the desired grain distribution in the desired product. Suitably the seed material is used in an amount of 25 to 500 g/l, preferably in an amount of 50 to 150 g/l.

After addition of the seed material the suspension is precipitated, which can take place at constant temperature, by normal cooling or by cooling according to a specific temperature profile. Suitably the precipitation takes place up until a molar ratio of Na$_2$O to Al$_2$O$_3$ of 2.6 to 3.1 has been reached. As a rule this process takes 24 to 60 hours. The suspension obtained after the precipitation is filtered in ways which are conventional to one skilled in the art.

The resultant Al$_2$(OH)$_3$ is distinguished by the following properties:

grain diameter in the 50 percent range $d_{50}$ of 5 to 25 μm, grain diameter in the 10 percent range $d_{10}$ of 1.0 to 4.5 μm, grain diameter in the 90 percent range $d_{90}$ of 10 to 50 μm, specific surface, according to BET, of 0.3 to 1.3 m²/g, surface roughness of 1.1 to 1.5.

This Al$_2$(OH)$_3$ produced according to the process of the invention, because of its excellent viscosity behavior, can be worked problem-free into plastics, preferably into thermosetting plastic, such as, unsaturated polyester resins (UP resins). Thus, extraordinarily high filling ratios of filled plastics with very good property profiles can be achieved. The surfaces of suitably produced molded articles are smooth. The following examples illustrate the invention.

EXAMPLE 1

In an agitation decomposer (8 m³ capacity) a P-alkaline solution at 45° C. with a Na$_2$O content of 145 g/l and an Al$_2$O$_3$ content of 88 g/l was mixed with a K-alkaline solution at 75° C. with a Na$_2$O content of 139 g/l and an Al$_2$O$_3$ content of 155 g/l. 5 m³ of a mixed alkaline solution with a molar ratio of Na$_2$O to Al$_2$O$_3$ of 2.01 resulted. This mixed alkaline solution was heated to approximately 70° C. and mixed with 50 kg/m³ of a ground Bayer Al(OH)$_3$ with $d_{50}$ of 9 to 13 μm, die of 1.5 μm, $d_{90}$ of 19 μm and a specific surface according to BET of 2.21 m²/g as the seed material. The resulting temperature was 67° C. The precipitation process was now run according to the following temperature profile: cooled from 67° to 60° C. in 12 hours and then stirred for 36 hours at this temperature. After this precipitation time, a molar ratio of Na$_2$O to Al$_2$O$_3$ of 2.96, which corresponded to a Al$_2$O$_3$ yield of 37 kg/m³, was reached. The total product yield (including the amount of seed material) of this absorptive precipitation process was 540 kg of aluminum hydroxide. The precipitated suspension was filtered on a band filter (approximately 15 m² filter surface) and the moist aluminum hydroxide was dried on a contact drier. The resultant Al(OH)$_3$ had a grain diameter in the 50 percent range of 8.7 μm, in the 10 percent range of 1.6 μm and in the 90 percent range of 19 μm, a specific surface according to BET of 1.18 m²/g and a surface roughness of 1.31. The viscosity of each of (a) the initial product, (b) the Al(OH)$_3$ according to the invention which was obtained according to Example 1 and (c) the product which was obtained according to the process of European Published Patent Application No. 011,667 (Apyral 4 of Vereinigte Aluminum Werke) for comparison, was tested in a acrylic resin (Modar 826 HT, ICI Acrylix).

Measurement conditions: 170 parts of Al(OH)$_3$ per 100 parts of resin, Brookfield HBT viscosimeter, Spindel 2, 50 rpm, 20° C.

Results: (a) 4000 mPaS (b) 2400 mPaS (invention) (c) 2600 mPaS (comparison).

The comparison of the degree of whiteness between product (b) and product (c), measured according to DIN 53163 (Erepho, 475 nm, Standard BaSO4), showed for: (b) 91.0 percent (invention) and (c) 86.2 percent (comparison).

EXAMPLE 2

In an agitation decomposer (8 m³ capacity) a P-alkaline solution at 48° C. with a Na$_2$O content of 152 g/l and an Al$_2$O$_3$ content of 78 g/l was mixed with a K-alkaline solution at 82° C. with a Na$_2$O content of 144 g/l and an Al$_2$O$_3$ content of 164 g/l 5 m³ of a mixed alkaline solution with a molar ratio of Na$_2$O to Al$_2$O$_3$ of 2.02 resulted. This mixed alkaline solution was heated to approximately 63° C. and mixed with 150 kg/m³ of a ground Bayer Al(OH)$_3$ with $d_{50}$ of 9 to 13 μm, $d_{10}$ of 15 μm and $d_{90}$ of 19 μm and a specific surface according to BET of 2.21 m²/g as the seed material. The resulting temperature was 60° C. The precipitation process was run at a steady temperature of 60° C. for 48 hours. After this precipitation time, a molar ratio of Na$_2$O to Al$_2$O$_3$ of 3.1 was reacted corresponding to a Al$_2$O$_3$ yield of 37 kg/m³. The total product yield of this precipitation process (including the seed material amount) was 1063 kg of aluminum hydroxide. The precipitated suspension was filtered on a band filter (approximately 15 m² filter surface) and the moist aluminum hydroxide was dried on a contact drier. The resultant Al(OH)$_3$ had a grain diameter in the 50 percent range of 6.8 μm, in the 10 percent range of 1.5 μm, and in the 90 percent range of 15 μm, a specific surface according to BET of 1.21 m²/g and a surface roughness of 1.2. The viscosity was measured according to Example 1 and the results were:

Results: (a) 4000 mPaS (b) 1600 mPaS (invention) (c) 2600 mPaS (comparison)

EXAMPLE 3

In a laboratory agitation decomposer (10 l capacity) a P-alkaline solution at 42° C. with a Na$_2$O content of 148 g/l and an Al$_2$O$_3$ content of 101 g/l was mixed with a K-alkaline solution at 79° C. with a Na$_2$O content of 138 g/l and an Al$_2$O$_3$ content of 154 g/l . 8 l of a mixed alkaline solution with a molar ratio of Na$_2$O to Al$_2$O$_3$ of 2.04 resulted. This mixed alkaline solution was heated to about 70° C. and mixed with 100 g/l of a ground Bayer Al(OH)$_3$ with d$_{50}$ of 8.26 µm, die of 1.41 µm and d$_{90}$ of 19.8 µm, and a specific surface according to BET of 2.03 m$^2$/g and a surface roughness of 2.44 as the seed material. The resulting temperature was 67° C. The precipitation process was then run according to the following temperature profile: cooled to 60° C. in 24 hours and then stirred for 26 hours at this temperature. After this precipitation time, a molar ratio of Na$_2$O to Al$_2$O$_3$ of 2.78 was reached corresponding to a Al$_2$O$_3$ yield of 33.5 kg/m$^3$. The total product yield (including the seed material amount) was 1.21 kg of aluminum hydroxide. The precipitated suspension was filtered on a laboratory nutsch filter (about 500 m$^2$) and dried in a drying oven at 105° C. The resultant Al(OH)$_3$ had a grain diameter in the 50 percent range of 8.14 µm, in the 10 percent range of 1.6 µm and in the 90 percent range of 19.6 µm, a specific surface according to BET of 0.89 m$^2$/g and a surface roughness of 1.21. The viscosity of each of initial product (a) and of product (b) obtained according to Example 3 were tested in an unsaturated polyester resin (Synolite W20, DSM) .

Measurement conditions: 175 parts of Al(OH)$_3$ per 100 parts of resin, Brookfield HBT viscosimeter, Spindel 3, 5 rpm, 23° C.

Results: (a) 141.6 PaS (b) 57.3 PaS

What is claimed is:

1. A flame-retarded polymeric composition comprising a polymeric material which contains aluminum hydroxide particles, the aluminum hydroxide particles having rounded grain surfaces, the particles of the aluminum hydroxide having a grain diameter in the 50 percent range d$_{50}$ of 5 to 25 µm, in the 90 percent range d$_{90}$ of 10 to 50 µm, and in the 10 percent range d$_{10}$ of 1.0 to 4.5 µm, a BET surface of 0.3 to 1.3 m$^2$/g, and a surface roughness coefficient of 1.1 to 1.5, the aluminum hydroxide particles being produced by the process comprising inoculating an alkaline solution which is derived from the Bayer process and which has a molar ratio of Na$_2$O to Al$_2$O$_3$ of 2.0 to 2.3, with 25 to 500 g/l of an aluminum hydroxide, the particles of which have a grain diameter in the 50 percent range d$_{50}$ of 5 to 25 µm, in the 90 percent range d$_{90}$ of 10 to 50 µm and in the 10 percent range d$_{10}$ of 1.0 to 4.5 µm, there being sufficient agitation of the alkaline solution to keep the inoculated particles in suspension, and the inoculated alkaline solution being maintained a sufficient amount of time to achieve sufficient particle growth to provide solid aluminum hydroxide with rounded grain surfaces, the particles of which have a grain diameter in the 50 percent range d$_{50}$ of 5 to 25 µm, in the 90 percent range d$_{90}$ of 10 to 50 µm and in the 10 percent range d$_{10}$ of 1.0 to 4.5µ, and then is precipitated at constant temperature or by normal cooling or by cooling at a specific temperature profile of said alkaline solution until a molar ratio of Na$_2$O to Al$_2$O$_3$ of 2.6 to 3.1 has been reached in said alkaline solution, and then said solid aluminum hydroxide with rounded grain surfaces is filtered off.

2. A process of preparing a flame-retarded polymeric composition comprising incorporating aluminum hydroxide particles as a flame-retarding filler into a polymeric material, the aluminum hydroxide particles having rounded grain surfaces, the particles of the aluminum hydroxide having a grain diameter in the 50 percent range d$_{50}$ of 5 to 25 µm, in the 90 percent range d$_{90}$ of 10 to 50 µm, and in the 10 percent range d$_{10}$ of 1.0 to 4.5 µm, a BET surface of 0.3 to 1.3 m$^2$/g, and a surface roughness coefficient of 1.1 to 1.5, the aluminum hydroxide particles being produced by the process comprising inoculating an alkaline solution which is derived from the Bayer process and which has a molar ratio of Na$_2$O to Al$_2$O$_3$ of 2.0 to 2.3, with 25 to 500 g/l of an aluminum hydroxide, the particles of which have a grain diameter in the 50 percent range d$_{50}$ of 5 to 25 µm, in the 90 percent range d$_{90}$ of 10 to 50 µm and in the 10 percent range d$_{10}$ of 1.0 to 4.5 µm, there being sufficient agitation of the alkaline solution to keep the inoculated particles in suspension, and the inoculated alkaline solution being maintained a sufficient amount of time to achieve sufficient particle growth to provide solid aluminum hydroxide with rounded grain surfaces, the particles of which have a grain diameter in the 50 percent range d$_{50}$ of 5 to 25 µm, in the 90 percent range d$_{90}$ of 10 to 50 µm and in the 10 percent range d$_{10}$ of 1.0 to 4.5µ, and then is precipitated at constant temperature or by normal cooling or by cooling at a specific temperature profile of said alkaline solution until a molar ratio of Na$_2$O to Al$_2$O$_3$ of 2.6 to 3.1 has been reached in said alkaline solution, and then said solid aluminum hydroxide with rounded grain surfaces is filtered off.

\* \* \* \* \*